(12) United States Patent
Oba et al.

(10) Patent No.: US 6,845,463 B2
(45) Date of Patent: Jan. 18, 2005

(54) SYSTEM FOR CONTRACTING OUT PART OF ACCEPTED REQUEST

(75) Inventors: Hidekazu Oba, Kanagawa (JP); Yutaka Anahara, Kanagawa (JP); Atsushi Matsumoto, Kanagawa (JP); Yuji Sano, Tokyo (JP); Kiyoshi Kuramochi, Tokyo (JP); Tetsuro Mishima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 17 days.

(21) Appl. No.: 09/892,075

(22) Filed: Jun. 26, 2001

(65) Prior Publication Data

US 2002/0002508 A1 Jan. 3, 2002

(30) Foreign Application Priority Data

Jun. 27, 2000 (JP) ........................................ 2000-193375

(51) Int. Cl.[7] ............................................... G06F 11/12
(52) U.S. Cl. .................. 714/1; 714/10; 705/9; 705/26; 705/27; 712/236; 712/28; 707/3
(58) Field of Search ............................. 707/8, 10, 102, 707/3, 4; 714/1, 10, 13, 2, 25; 712/236, 28; 705/26, 35

(56) References Cited

U.S. PATENT DOCUMENTS 6,067,633 A * 5/2000 Robbins et al. ................. 714/1
6,101,484 A * 8/2000 Halbert et al. ................. 705/26

FOREIGN PATENT DOCUMENTS

| JP | 2000-57214 | | 2/1990 |
| JP | 2000-59005 | | 2/1990 |
| JP | 2000-57214 | * | 6/1998 |
| JP | 11-110451 | | 4/1999 |

* cited by examiner

Primary Examiner—Pierre E Elisca
(74) Attorney, Agent, or Firm—Morgan & Finnegan, LLP

(57) ABSTRACT

An order placement and acceptance system includes a first data processing device for sending a design data for processing and manufacture of a predetermined item, a second data processing device for obtaining the design data sent from the first data processing device and for sending at least a part of the design data, and a third data processing device for obtaining at least the part of the design data sent from the second data processing device.

8 Claims, 3 Drawing Sheets

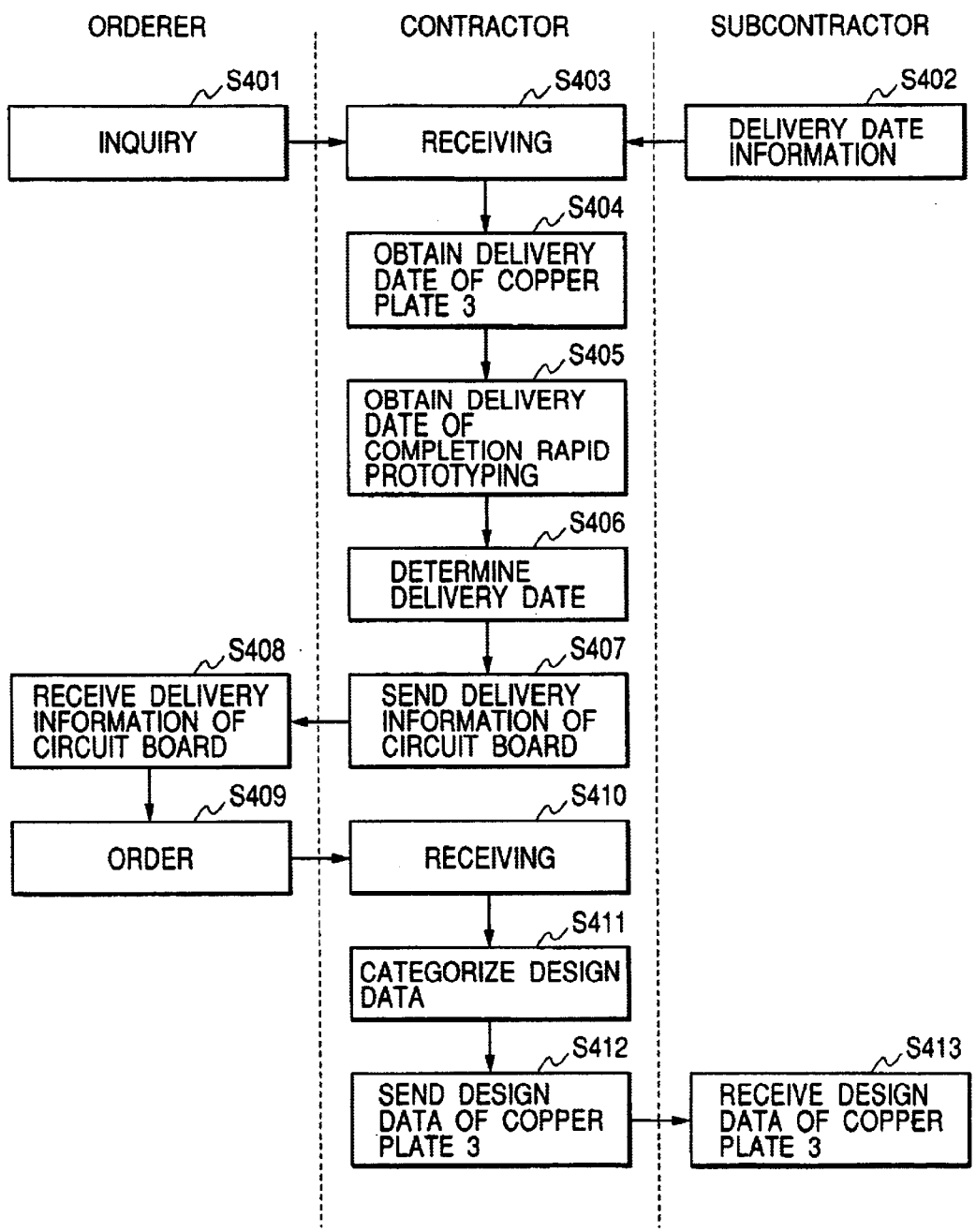

SYSTEM FOR CONTRACTING OUT PART OF ACCEPTED REQUEST

BACKGROUND OF THE INVENTION

1. Field of the Invention

This invention relates to a system, apparatus, method, and computer readable storage medium for contracting out a part of an accepted request, which are suitable for use in placing and accepting an order for a three-dimensional circuit board that is to be processed and manufactured with rapid prototyping for example.

2. Related Background Art

In recent years, the division of work processes has been taking place in various fields, and it is common, for example, that a plurality of people are involved in processing and manufacture of just one item. For example, if a contractor accepts an order for processing and manufacture of a certain item, the contractor often contracts out a part of the processing and manufacture of the ordered item to other people (subcontractors).

In such a situation where a plurality of people are involved in processing and manufacture of a certain item, it is desired to efficiently carry out transactions such as placing an order from an orderer and contracting out to subcontractors as well as efficiently exchange design data or other data on the item.

SUMMARY OF THE INVENTION

This invention has been made to solve the above-mentioned problem, and its object is to increase efficiency of transactions for placement and acceptance of an order by using network technology such as the Internet in the situation where a plurality of people are involved in processing and manufacture of a predetermined item.

To achieve this object, an embodiment of this invention provides an order placement and acceptance system comprising a first data processing device for sending a design data for processing and manufacture of a predetermined item, a second data processing device for obtaining the design data sent from the first data processing device and for sending at least a part of the design data, and a third data processing device for obtaining said at least a part of the design data sent from the second data processing device, wherein the first, second, and third data processing devices are connected with each other via a network.

From another viewpoint, the embodiment of this invention provides a data processing method comprising the steps of receiving design data for processing and manufacture of a predetermined item, and sending at least a part of the design data.

From yet another viewpoint, the embodiment of this invention provides a computer readable storage medium for storing programs to execute processing of receiving design data for processing and manufacturing of a predetermined item, and sending at least a part of the design data.

Other objects and features of this invention will be apparent from the following description and the drawings.

BRIEF DESCRIPTION OF THE DRAWINGS

FIG. 4 shows exemplary transactions for placing and accepting an order using the order placement and acceptance system of the embodiment.

DETAILED DESCRIPTION OF THE PREFERRED EMBODIMENT

Here, an order placement and acceptance system, data processing device for placing orders, its method, and computer readable storage medium according to an embodiment of this invention are described with reference to the drawings. This embodiment involves placing and accepting an order for processing and manufacture of a circuit board by using a network such as the Internet.

Figure 1:
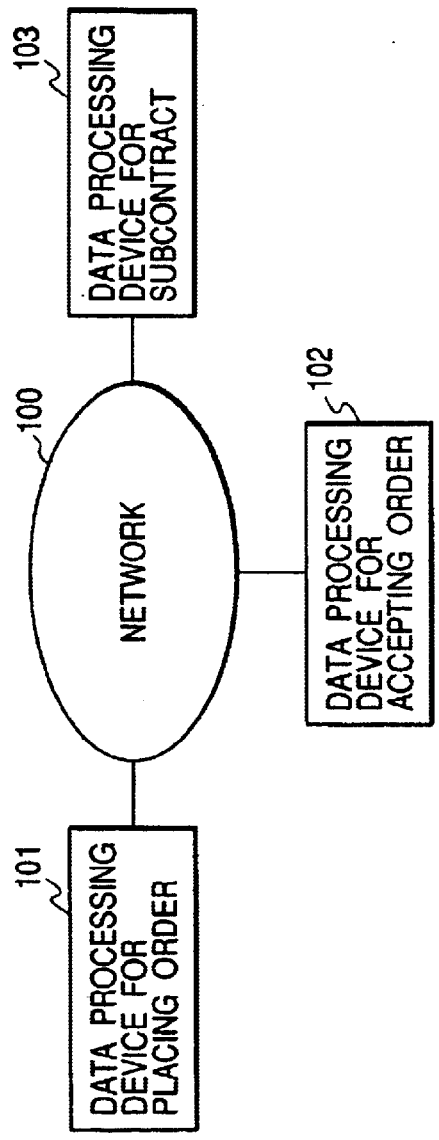
FIG. 1 shows an overall configuration of an order placement and acceptance system of the embodiment.

FIG. 1 shows an overview of the order placement and acceptance system of the embodiment. Reference numeral 100 is a network such as the Internet.

Reference numeral 101 is a data processing device for placing orders, through which an orderer places an order with a contractor, who will be described later, for processing and manufacture of the circuit board.

Reference numeral 102 is a data processing device for accepting orders, through which the contractor accepts the order from the orderer for the processing and manufacture of the circuit board and also contracts out the processing and manufacture of the circuit board to a subcontractor, who will be described later.

Reference numeral 103 is a data processing device for subcontracts, through which the subcontractor, who is under contract or in other relationship with the contractor, accepts the request for the subcontract of the processing and manufacture of the circuit board.

Figure 2:
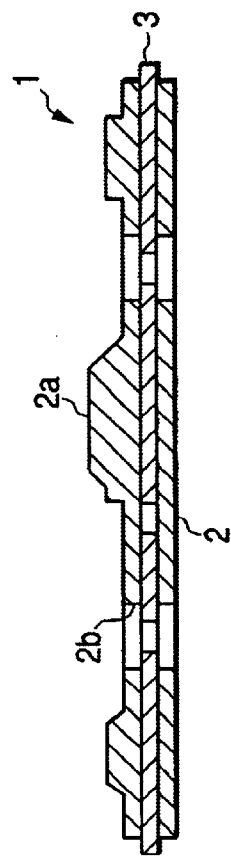
FIG. 2 is a sectional view for describing a circuit board 1 comprised of a resin 2 and a copper plate 3.

Now, a detailed description of the order placement and acceptance system shown in FIG. 1 is given below, wherein the circuit board for which an order are to be placed and accepted in this order placement and acceptance system is first described. As shown in FIG. 2, the circuit board 1 has a three-dimensional geometry, wherein a copper plate 3 with a wiring pattern is inserted in a resin 2. The surface of the resin 2 is formed with projections and depressions 2a, which are utilized for fixing electronic parts or other parts (not shown) on the circuit board 1. The resin 2 is also formed with holes 2b to expose the inserted copper plate 3. These holes 2b are utilized for connecting electronic parts or other parts (not shown) to the copper plate 3.

Conventionally, in processing and manufacturing the circuit board 1 as shown in FIG. 2, an approach has been taken that is to insert the copper plate 3 with the wiring pattern into a mold and to pour the resin into the mold. However, this approach requires creation of the mold. Accordingly, since making a prototype for example would require creation of the mold for that prototype, this approach has problems of high cost and a long time to finish making the prototype.

In view of these problems, a new approach to processing and manufacture of the circuit board 1 will be the use of rapid prototyping technique. Rapid prototyping involves scanning a material such as a UV curing resin with UV light to leave only exposed areas as solids. That is, the material such as a UV curing resin before being cured is put around the copper plate 3 with the wiring pattern and is cured by UV scan to form the circuit board 1 as shown in FIG. 2.

Since rapid prototyping facilitates processing and manufacture for small three-dimensional geometries by controlling UV scan, it is suitable for processing and manufacture of the three-dimensional circuit board 1. Further, it eliminates the cost of creating a mold and, if 3D CAD data is provided, it can control a rapid prototyping device according to the data (rapid prototyping CAM (Computer Aided Manufacturing)). Thus, rapid prototyping realizes significantly increased speed and reduced cost, and it is highly effective especially in cases such as making a prototype of the circuit board 1.

Returning to the description of the order placement and acceptance system shown in FIG. 1, this order placement and acceptance system is a system for placing and accepting an order for processing and manufacture of the circuit board 1 with rapid prototyping described above.

Figure 3:
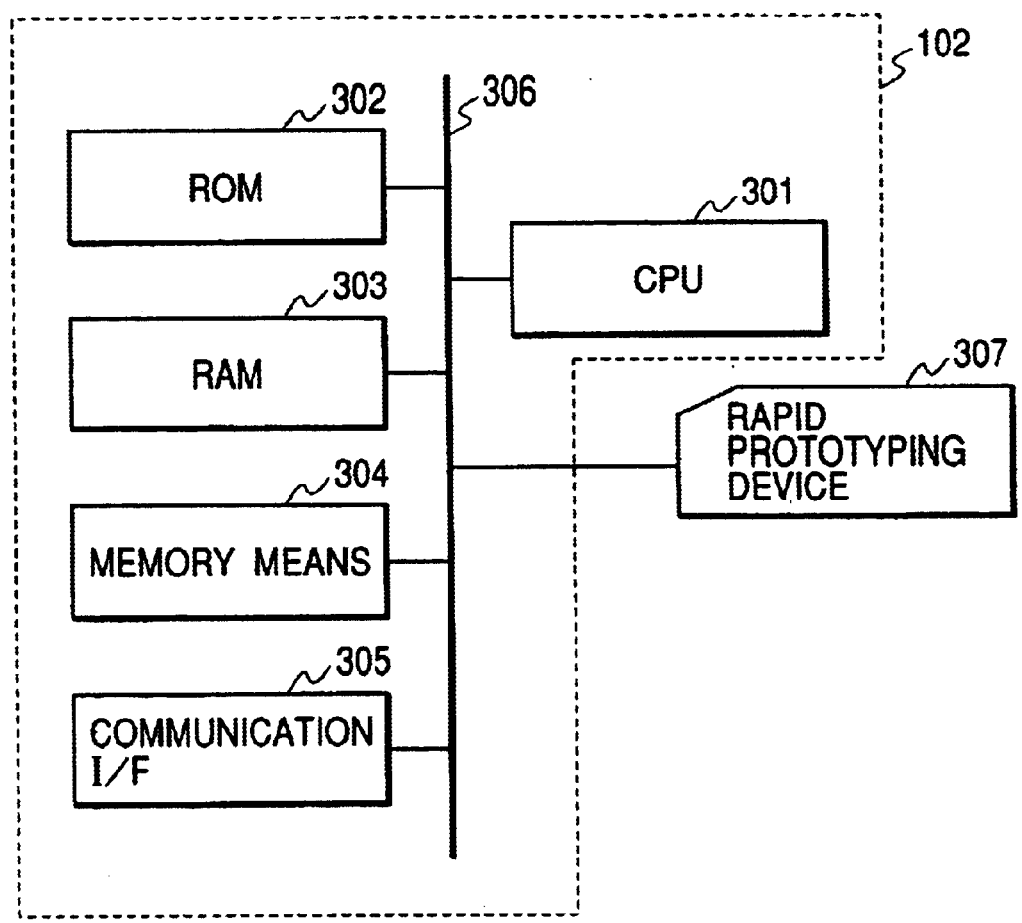
FIG. 3 shows an exemplary hardware configuration of a data processing device for accepting orders.

FIG. 3 shows an exemplary hardware configuration of the data processing device for accepting orders 102. Reference numeral 301 is a CPU, which controls various components through a bus 306 to transmit and receive data, combine data, and so on. It is through the bus 306 that various components (devices) transfer address signals, control signals, and various kinds of data to each other.

Reference numeral 302 is ROM, which stores control procedures (computer programs) for the CPU 301. Execution of the control procedures by the CPU 301 enables execution of processing such as data transfer and data combination. Reference numeral 303 is RAM, which is used as work memory for data transmission and reception, data combination, etc., and as temporary memory means for the control on the various components.

Reference numeral 304 is memory means for archiving, which stores various kinds of information. Reference numeral 305 is a communication interface for connecting to the network 100 such as the Internet.

To this data processing device for accepting orders 102 thus configured is connected a rapid prototyping device 307 for performing rapid prototyping. Therefore, once the data processing device 102 obtains design data including 3D CAD data on the circuit board 1 as described later, just transferring the design data directly to the rapid prototyping device 307 enables the rapid prototyping device 307 to process and manufacture the circuit board 1.

For a specific description, it will be supposed that: an orderer using the data processing device for placing orders 101 is a vendor which designs the circuit board 1; a contractor using the data processing device for accepting orders 102 is a circuit board manufacturer which responds to the vendor's order by processing and manufacturing the circuit board 1 with rapid prototyping; and a subcontractor using the data processing device for subcontracts 103 is a subcontractor company which responds to the circuit board manufacturer's request by processing and manufacturing the copper plate 3 with the wiring pattern of the circuit board 1. Although FIG. 1 shows only one data processing device for subcontracts 103, there may be several ones (several subcontractor companies may be under contract with the circuit board manufacturer).

FIG. 4 shows exemplary transactions for order placement and acceptance using the order placement and acceptance system according to the embodiment. When placing an order for processing and manufacture of the circuit board 1, the orderer (vendor) makes an inquiry into the data processing device for accepting orders 102 from the data processing device for placing orders 101 over the network 100 (step S401). At this time, it sends to the data processing device for accepting orders 102 either the design data itself containing the 3D CAD data of the circuit board 1 or outline information (information indicating complexity or other characteristics of the wiring pattern to be on the copper plate 3 and of the projections and depressions of the resin 2) instead of the design data.

On the other hand, the subcontractor (subcontractor company) sends delivery date information to the data processing device for accepting orders 102 from the data processing device for subcontracts 103 over the network 100 (step S402). Here, the delivery date information is the information about the delivery date for the copper plate 3, which is the subcontracted item in this invention, and indicates that "delivery is two weeks after for a complex wiring pattern" or "delivery is several days after for a simple wiring pattern" for example. Such delivery date information is stored in the data processing device for accepting orders 102, and it is adapted to be updated daily for example, through the data processing device for subcontracts 103, since the delivery dates change according to the subcontractor's (subcontractor company's) circumstances.

When the contractor (circuit board manufacturer) accepts the inquiry from the orderer (General contractor) as mentioned above (step S403), it determines complexity or other characteristics of the wiring pattern of the copper plate 3 based on the design data or the outline information and checks it against the delivery date information from the subcontractor (subcontractor company) to obtain the delivery date for the copper plate 3 (step S404).

Further, the contractor (circuit board manufacturer) determines complexity or other characteristics of the projections and depressions of the resin 2 to obtain the period needed to make the circuit board 1 in-house with rapid prototyping (step S405).

Then, it determines the delivery date for the circuit board 1 based on the delivery date for the copper plate 3 and the period for making the circuit board 1 in-house with rapid prototyping obtained as described above (step S406), and sends that delivery date information to the data processing device for placing orders 101 from the data processing device for accepting orders 102 over the network 100 (step S407).

The delivery date determination described above may be made at the discretion of the contractor or may be made automatically in the data processing device for accepting orders 102. For example, the contractor may exchange a promise in advance with the orderer and the subcontractor to classify complexity or other characteristics of the wiring pattern of the copper plate 3 into levels such as a, b, and so on. Then it allows the orderer to send, on inquiry, information on complexity a, b, and so on of the wiring pattern of the circuit board 1 that is to be ordered. It also allows the subcontractor to send the delivery date corresponding to the complexity a, b, and so on (for example, information indicating the delivery date for the copper plate 3 for the complexity a). By doing so, the delivery date for the copper plate 3 can be automatically determined in the data processing device for accepting orders 102 only by matching the complexity.

Similarly, the contractor may exchange a promise with the orderer to classify complexity or other characteristics of the projections and depressions of the resin 2 into levels such as A, B, and so on. It also inputs periods needed to make the circuit board 1 in-house with rapid prototyping corresponding to the complexity A, B, and so on to the data processing device for accepting orders 102. Then it allows the orderer to send, on inquiry, information on the complexity A, B, and so on of the projections and depressions of the circuit board 1 that is to be ordered. By doing so, the period needed to make the circuit board 1 can be automatically determined in the data processing device for accepting orders 102 only by matching the complexity. This period plus the delivery time for the copper plate 3 determined as described above can thus determine the delivery date for the circuit board 1.

If there are several subcontractor companies, a company that offers the most early delivery date may be selected, for example. Alternatively, the subcontractor companies may be managed by grading their technical level in advance so that a subcontractor that meets a required technical level may be selected depending on complexity or other characteristics of the wiring pattern of the copper plate 3.

The orderer (General contractor) obtains the delivery date information from the contractor (circuit board manufacturer) (step S408), and then places the formal order with the data processing device for accepting orders 102 from the data processing device for placing orders 101 over the network 100 (step S409). If the design data has not been sent to the contractor at the inquiry step mentioned above, it is sent at this step.

When the contractor (circuit board manufacturer) receives the formal order through the data processing device for accepting orders 102 (step S410), it categorizes the design data sent from the data processing device for placing orders 101 (step S411) and sends a part of the design data relevant to the copper plate 3 to the data processing device for subcontracts 103 from the data processing device for accepting order 102 over the network 100 (step S412).

The categorization of the design data mentioned above may be performed by the contractor (circuit board manufacturer) or may be automatically performed in the data processing device for accepting orders 102. For example, the contractor may exchange a promise with the orderer so that the contractor can receive the design data on the circuit board 1 that can be categorized by the contractor into the part relevant to rapid prototyping and the part relevant to the copper plate 3. For this purpose, the contractor may allow the data processing device for placing orders 101 to include categorization information in the design data that is to be sent, for example. By doing so, the data processing device for accepting orders 102 can automatically categorize the design data and send only the design data relevant to the copper plate 3 to the data processing device for subcontracts 103.

In addition, the design data does not necessarily have to be categorized. The data processing device for accepting orders 102 may save the design data received from the data processing device for placing orders 101 and send a copy of it to the data processing device for subcontracts 103.

When the subcontractor (subcontractor company) obtains the design data relevant to the copper plate 3 by means of the data processing device for subcontracts 103 (step S413) as a result of the placement and acceptance of the order as described above, the subcontractor (subcontractor company) begins to process and manufacture the copper plate 3 according to the design data. After the copper plate 3 with the wiring pattern is made, it is delivered to the contractor (circuit board manufacturer).

When the copper plate 3 with the wiring pattern is delivered from the subcontractor (subcontractor company), the contractor (circuit board manufacturer) begins to process and manufacture the circuit board 1 with rapid prototyping according to the design data. Here, if the rapid prototyping device 307 is connected to the data processing device for accepting orders 102 as mentioned above, the circuit board 1 can be processed and manufactured in the rapid prototyping device 307 only by transferring the design data directly to the rapid prototyping device 307. After the circuit board 1 is made, it is delivered to the orderer (General contractor).

As described above, this embodiment enables effective transactions for placement and acceptance of the order by using network technology such as the Internet in the situation where a plurality of people are involved in processing and manufacture of the circuit board 1.

Particularly, when the circuit board 1 is processed and manufactured with rapid prototyping as in this embodiment, exchanging the design data over the network provides significant effectiveness. For example, if the design data is exchanged over the network in conventional processing and manufacture of a circuit board with creation of a mold, network-independent operation such as creation of the mold and pouring of a resin into the mold would be necessary after all. Therefore, little advantage is drawn from the use of the network.

On the other hand, in rapid prototyping, full advantage can be drawn from the use of the network because the circuit board 1 can be processed and manufactured according to the design data itself obtained via the network. This, together with the effectiveness of rapid prototyping, can realize significantly increased speed and reduced cost.

Although the above example includes making an inquiry as a prior step, it is also possible to place the formal order without inquiry. Again, the orderer (General contractor) can be informed of the delivery date for the circuit board 1 immediately after the formal order, and the orderer (General contractor) can efficiently manage schedules by obtaining the delivery date for the circuit board 1.

Further, although the above example includes transactions between companies using the Internet, it may be also applied to a corporate system using an intranet. That is, the data processing device for placing orders 101 may be located at a designing department, the data processing device for accepting orders 102 may be located at a rapid prototyping manufacturing department, and the data processing device for subcontracts 103 may be located at a copper plate manufacturing department in a company.

Further, although the contractor has been described to perform rapid prototyping, the invention is not limited to this. For example, the data processing device for placing orders 101 may be located at a designing department in a company, and the data processing device for subcontracts 103 may be located at each of a rapid prototyping manufacturing department and a copper plate manufacturing department. Then, with the data processing device for accepting orders 102 located at a manufacturing management department, it is possible to appropriately assign orders from several designing departments to the rapid prototyping manufacturing department and the copper plate manufacturing department for example, so that manufacture and processing of the circuit board 1 can be centrally managed.

Other Embodiments

To operate various devices to provide the features of the above embodiment, this invention also includes in its category the implementation by supplying program codes of software that are for providing the features of the above embodiment for a computer within an apparatus or system connected to the various devices, and by operating the various devices according to programs stored in the computer (CPU or MPU) of the system or apparatus.

Here, the program codes themselves of the software provides the features of the above embodiment, and this invention therefore includes the program codes themselves and means for supplying the program codes to the computer, for example a recording medium having the program codes stored therein. The recording medium having the program codes stored therein may be a floppy disk, a hard disk, an optical disk, a magneto-optical disk, a CD-ROM, a magnetic tape, a nonvolatile memory card, ROM, etc.

It is needles to say that the program codes are included in the embodiment of this invention not only if the computer executes the supplied program codes to provide the features of the above embodiment but also if the program codes cooperate with an OS (operating system) or other application software running on the computer to provide the features of the above embodiment.

It is also needles to say that the program codes are included in this invention even if the supplied program codes are stored in memory in a feature expansion board of the computer or a feature expansion unit connected to the computer, after which a CPU or other components in the feature expansion board or the feature expansion unit performs a part or whole of the actual processing based on the direction from the program codes, and the features of the above embodiment are provided by that processing.

The geometries and configurations shown in the above embodiment are merely exemplary materialization for carrying out this invention, and they should not limit interpretation of the technical scope of this invention. That is, this invention can be carried out in various forms without departing from its spirit or main features.

According to this embodiment, as described above, efficiency of transactions for placing and accepting an order can be increased in the situation where a plurality of people are involved in processing and manufacture of a predetermined item.

What is claimed is:

1. An order placement and acceptance system comprising:
   a first data processing device for sending a design data about processing a predetermined item;
   a second data processing device for obtaining the design data sent from the first data processing device and for sending the design data to process a first step to make a product and for determining a first period needed to process a first step on the basis of a complexity of the design data; and
   a third data processing device for processing a second step of the product based on the design data sent from the second data processing device and for determining second period needed to process the second step of making a product on a basis of a complexity of a part of the design data,
   wherein the first, second, and third data processing devices are connected with each other via a network and the second data processing device sends a delivery date which is the first period plus the second period to the first data processing device.

2. The order placement and acceptance system according to claim 1, wherein the second data processing device comprises data categorizing means for categorizing the design data.

3. The order placement and acceptance system according to claim 1, wherein the third data processing device is more than one, and the second data processing device sends said at least a part of the design data to a selected one of the third data processing devices.

4. The order placement and acceptance system according to claim 1, wherein the predetermined item is a three-dimensional circuit board having a conductive plate with a wiring pattern inserted into a resin, the resin part being processed and manufactured in a three dimensional shape with rapid prototyping.

5. The order placement and acceptance system according to claim 4, wherein said at least a part of the design data is data on the conductive plate with a wiring pattern.

6. A data processing device comprising:
   design data receiving means for receiving design data about processing steps to make a product from a first data processing device;
   design data sending means for sending a part of the design data to a second data processing device;
   determining means for determining a delivery date which is a first period needed to process the data at the data processing device plus a second period needed to process at the second processing device; and
   sending means for sending information on a delivery date to the first data processing device;
   wherein the first period and the second period are determined on a basis of a complexity of the design data.

7. The data processing device according to claim 6, further comprising data categorizing means for categorizing the design data.

8. A computer readable storage medium for storing programs to execute processing of:
   receiving design data about processing steps to make a product from a first data processing device;
   sending a part of the design data to a second data processing device;
   determining delivery date which is the first period needed to process the data at the data processing device plus a second period needed to process at the second processing device; and
   sending information on the delivery date on the first data processing device;
   wherein the first period and the second period are determined on a basis of a complexity of the design data.

* * * * *